United States Patent
Speer et al.

(10) Patent No.: US 9,407,589 B2
(45) Date of Patent: Aug. 2, 2016

(54) SYSTEM AND METHOD FOR FOLLOWING TOPICS IN AN ELECTRONIC TEXTUAL CONVERSATION

(71) Applicant: Luminoso Technologies, Inc., Cambridge, MA (US)

(72) Inventors: Robert Speer, Cambridge, MA (US); Lance Nathan, Arlington, MA (US)

(73) Assignee: Luminoso Technologies, Inc., Cambridge, MA (US)

( * ) Notice: Subject to any disclaimer, the term of this patent is extended or adjusted under 35 U.S.C. 154(b) by 240 days.

(21) Appl. No.: 14/290,149

(22) Filed: May 29, 2014

(65) Prior Publication Data
US 2015/0350139 A1    Dec. 3, 2015

(51) Int. Cl.
G06F 15/16    (2006.01)
H04L 12/58    (2006.01)
G06F 17/30    (2006.01)

(52) U.S. Cl.
CPC .......... *H04L 51/16* (2013.01); *G06F 17/30867* (2013.01); *H04L 51/32* (2013.01)

(58) Field of Classification Search
CPC .... G06F 17/30867; H04L 51/16; H04L 51/32
USPC ....................................................... 709/206
See application file for complete search history.

(56) References Cited

U.S. PATENT DOCUMENTS

| | | | | |
|---|---|---|---|---|
| 8,606,742 | B1* | 12/2013 | Kim | G06Q 10/063 706/45 |
| 8,862,591 | B2* | 10/2014 | Chowdhury | G06F 3/0482 707/748 |
| 2004/0003097 | A1* | 1/2004 | Willis | G06F 17/30873 709/228 |
| 2004/0064431 | A1* | 4/2004 | Dorner | G06F 17/30867 |
| 2015/0172227 | A1* | 6/2015 | Grove, II | H04L 12/1813 709/206 |

OTHER PUBLICATIONS

Cataldi et al. (Emerging Topic Detection on Twitter based on Temporal and Social Terms Evaluation, Jul. 25, 2010, ACM 978-1-4503-0220-3, pp. 1-10.*

* cited by examiner

*Primary Examiner* — Moustafa M Meky
*Assistant Examiner* — Thorne E Waugh
(74) *Attorney, Agent, or Firm* — Law Office of Ilya Libenzon

(57) ABSTRACT

A method for following a topic in an electronic textual conversation, the method includes selecting, by a computing device, one or more primary terms related to a topic, sending, by the computing device, to at least one communication service, a first query containing the at least one primary term, receiving, by the computing device, from the at least one communication service, at least one first set of messages responsive to the first query, for each first set, extracting, by the computing device, from the first set of messages, a first plurality of additional terms, and for each term of the first plurality of additional terms, enumerating, by the computing device, the messages of the first set in which the term appears and adding the term to a list of secondary terms if the enumeration exceeds a threshold amount.

18 Claims, 5 Drawing Sheets

SYSTEM AND METHOD FOR FOLLOWING TOPICS IN AN ELECTRONIC TEXTUAL CONVERSATION

TECHNICAL FIELD

Embodiments disclosed herein relate generally to methods and systems for language processing, and in particular to systems and methods for automatically following electronic textual conversations.

BACKGROUND ART

When there is breaking news, or a major event in sports, entertainment, or politics, people will be using various forms of social media to discuss it live in real time. Frequently, these conversations over social media provide information that is available through no other form of media. Some events are discussed in social media conversations long before any more conventional reporting can catch up to them, and involve volumes of information beyond the capacity of conventional media to represent. It can thus be valuable to collect a stream of these social media messages, so that they can be visualized, data-mined, or simply shown in a unified stream. Usually, there will be no single, organized way to get all the messages. The conversations can take place over a wide array of platforms, from text-based messaging over social networks to online discussion boards, in multiple languages, and involve enormous numbers of participants. The sheer volume of communication passing over networks makes it highly challenging to find and collate conversation on a particular topic. Not only is there a vast amount of data to search for, the data is far from static. Traditional indexing-based searches cannot account for the burgeoning volume of new conversation streaming onto public platforms around the world when the conversation is taking place.

Therefore, there is a need for an effective way to locate and collect electronic conversations concerning a topic.

SUMMARY OF THE EMBODIMENTS

A method is disclosed for following a topic in an electronic textual conversation. In one embodiment, the method involves selecting, by a computing device, one or more primary terms related to a topic. The embodiment further involves sending, by the computing device, to at least one communication service, a first query containing the at least one primary term. The embodiment also involves receiving, by the computing device, from the at least one communication service, at least one first set of messages responsive to the first query. The embodiment additionally involves for each first set, extracting, by the computing device, from the first set of messages, a first plurality of additional terms, and for each term of the first plurality of additional terms, enumerating, by the computing device, the messages of the first set in which the term appears and adding the term to a list of secondary terms if the enumeration exceeds a threshold amount.

In a related embodiment of the method, receiving further includes identifying the language of each message returned in response to the query and for each determined language, creating a first set of messages, wherein each message in the first set of messages is primarily in the determined language. In another embodiment, enumerating further includes weighting the enumeration of each term according to the frequency of the term in a corpus of documents. In an additional embodiment, weighting further involves determining the language of the message from which the term was extracted and weighting the enumeration of each term according to the frequency of the term in a corpus of documents in the same language as a message from which the term was extracted. Another embodiment additionally involves storing, by the computing device, the messages in memory accessible to the computing device. Another embodiment also includes sending, by the computing device, to the at least one communication service, at least one second query containing the at least one primary term and the set of secondary terms.

Another related embodiment also includes receiving, by the computing device, from the at least one communication service, at least one second set of messages responsive to each second query and, for each second set of messages, extracting, by the computing device, from the second set of messages, a second plurality of terms, determining, by the computing device, a corresponding set of previously received messages having a related set of secondary terms, for each term of each set of secondary terms relating to the corresponding set of messages and of the second plurality of terms, counting, by the computing device, the messages of the corresponding set and the second set in which the term and either (i) one of the at least one primary term or (ii) at least two of the secondary terms appears, and modifying, by the computing device, the list of secondary terms, based on the count for each term and a miss score calculated for each term.

In a related embodiment, receiving the at least one second set of messages further includes, for each second query, determining the language of each message returned in response to the second query and, for each determined language, creating a second set of messages, wherein each message in the second set of messages is primarily in the determined language. Determining the corresponding set of previously received messages further includes determining all previously received messages in the determined language, in another embodiment. In an additional embodiment, counting further includes computing, for each of the messages of the corresponding set of previously received messages and the second set in which the term and either (i) one of the at least one primary term or (ii) at least two of the secondary terms appears, a weight based on the number of primary and secondary terms appearing in the message and incrementing the count for the term by an amount determined by the weight. A related embodiment involves increasing the miss score for the term by an amount determined by the weight.

In another embodiment, modifying further involves determining that a term of the second plurality of terms is not in the list of secondary terms, calculating the miss score for the term according to the frequency of the term in a corpus of documents, determining that the count of the term exceeds a threshold relative to the magnitude of the miss score of the term, and adding the term to the list of secondary terms, based on the determination that the count exceeds the threshold value. A related embodiment involves determining the language of the message from which the term was extracted and selecting a corpus of documents in the determined language. In another embodiment modifying further involves determining that a term of the second plurality of terms is in the list of secondary terms, calculating the miss score by enumerating a number of messages in the related set containing the term in which neither (i) one of the at least one primary term nor (ii) at least two of the secondary terms appears, determining that the count of the term does not exceed a threshold relative to the magnitude of the miss score of the term, and removing the term from the list of secondary terms, based on the determination that the count does not exceed the threshold. In another embodiment, modifying further involves calculating a score for each term of the list of secondary terms by comparing the count for that term to the number of messages of the corresponding set of previously received messages and the second set of messages in which either (i) one of the at least one primary term or (ii) at least two of the secondary terms appears, ranking the terms of the secondary list of terms according to the calculated scores, and eliminating the lowest-scoring term.

An additional embodiment involves determining that a message containing the term is spam, discarding the message, and increasing the miss score for all terms appearing in the message. Another embodiment involves saving, in memory accessible to the computing device, each message in which either (i) one of the at least one primary term or (ii) at least two of the secondary terms appears. Another embodiment involves publishing a set of messages in which either (i) one of the at least one primary term or (ii) at least two of the secondary terms appears. Yet another embodiment involves determining that a message containing the term is a duplicate of a previously received message, discarding the message, and excluding the message from the count of messages of the corresponding set and the second set in which the term and either (i) one of the at least one primary term or (ii) at least two of the secondary terms appears.

A system is also disclosed for following topics in an electronic textual conversation. The system includes a computing device. The system further includes at least one follower, executing on the computing device, each follower configured to select one or more primary terms related to a topic, to enumerate the messages of the first set in which the term appears and to add the term to a list of secondary terms if the enumeration exceeds a threshold amount. The system also includes at least one listener, executing on the computing device, each listener configured to send, to at least one communication service, a first one query, each query containing at least one primary term, and to receive, from the communication service, at least one first set of messages responsive to the first query. The system also includes at least one distributor, executing on the computing device, and configured to receive, from the at least one listener, at least one first set of messages, to determine, for each message, at least one topic to which the message relates, to transmit each message to a follower corresponding to each related topic, and to extract, from a plurality of messages containing the one or more primary terms, a plurality of additional terms Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the system and method.

BRIEF DESCRIPTION OF THE DRAWINGS

The preceding summary, as well as the following detailed description of the disclosed system and method, will be better understood when read in conjunction with the attached drawings. It should be understood, however, that neither the system nor the method is limited to the precise arrangements and instrumentalities shown.

DETAILED DESCRIPTION OF SPECIFIC EMBODIMENTS

Figure 1A:
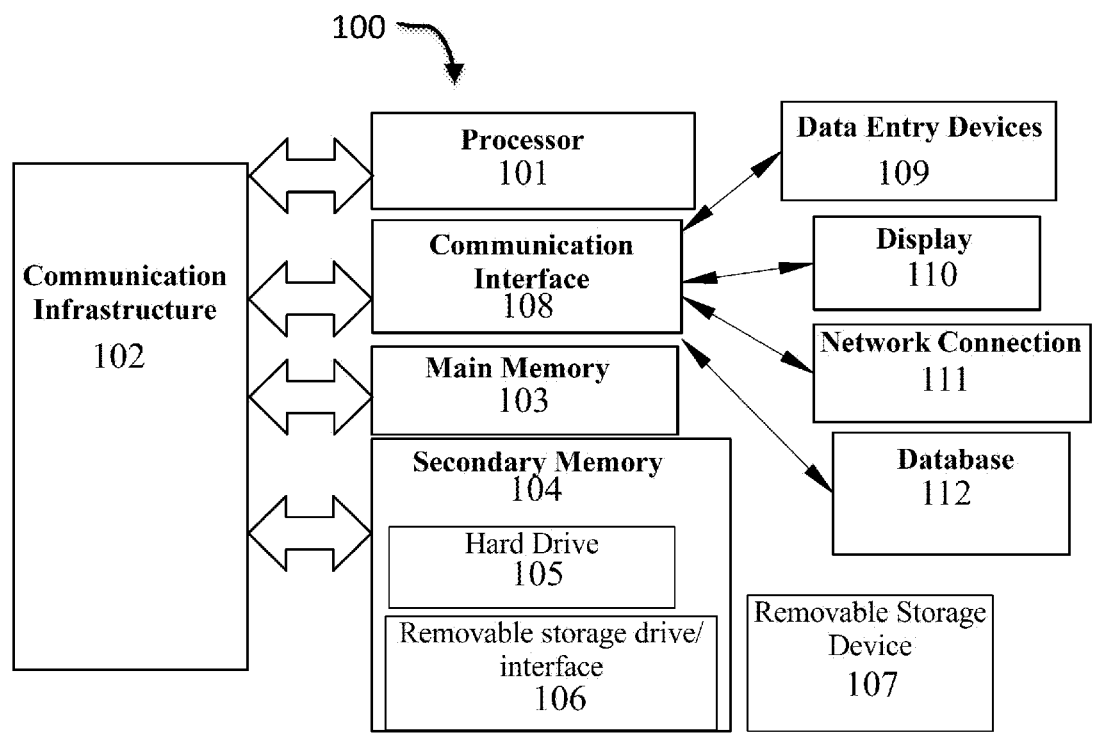
FIG. 1A is a schematic diagram depicting a computing device.

Some embodiments of the disclosed system and methods will be better understood by reference to the following comments concerning computing devices. A "computing device" may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general. An exemplary computing device is illustrated by FIG. 1A. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 is are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers.

In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system.

Where embodiments are implemented using software, the software may be stored in a computer program product and loaded into the computing device using a removable storage drive or interface 106, a hard disk drive 105, or a communications interface 108.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 1A. Web application platforms typically include at least one client device 120, which is an computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also an computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause an computing device to operate as a web application client 120. Thus, as a general matter, web applications 123 require some computer program configuration of both the client device (or devices) 120 and the server 122. The computer program that comprises the web application component on either computing device's system FIG. 1A configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Embodiments of the disclosed system and method dynamically derive effective terms with which to search for a topic in an electronic conversation. This system and method makes it possible to glean relevant messages from streams too active to transmit in their entirety. The dynamic generation of new search terms allows the system automatically to follow drift over time in the words and phrases used to discuss a topic. The system can also respond through dynamic generation of new search terms to new events relevant to the topic that occur partway through an ongoing conversation. Users can request the system to follow a new topic or read or search the messages pertaining to a topic the system is already following.

Figure 2:
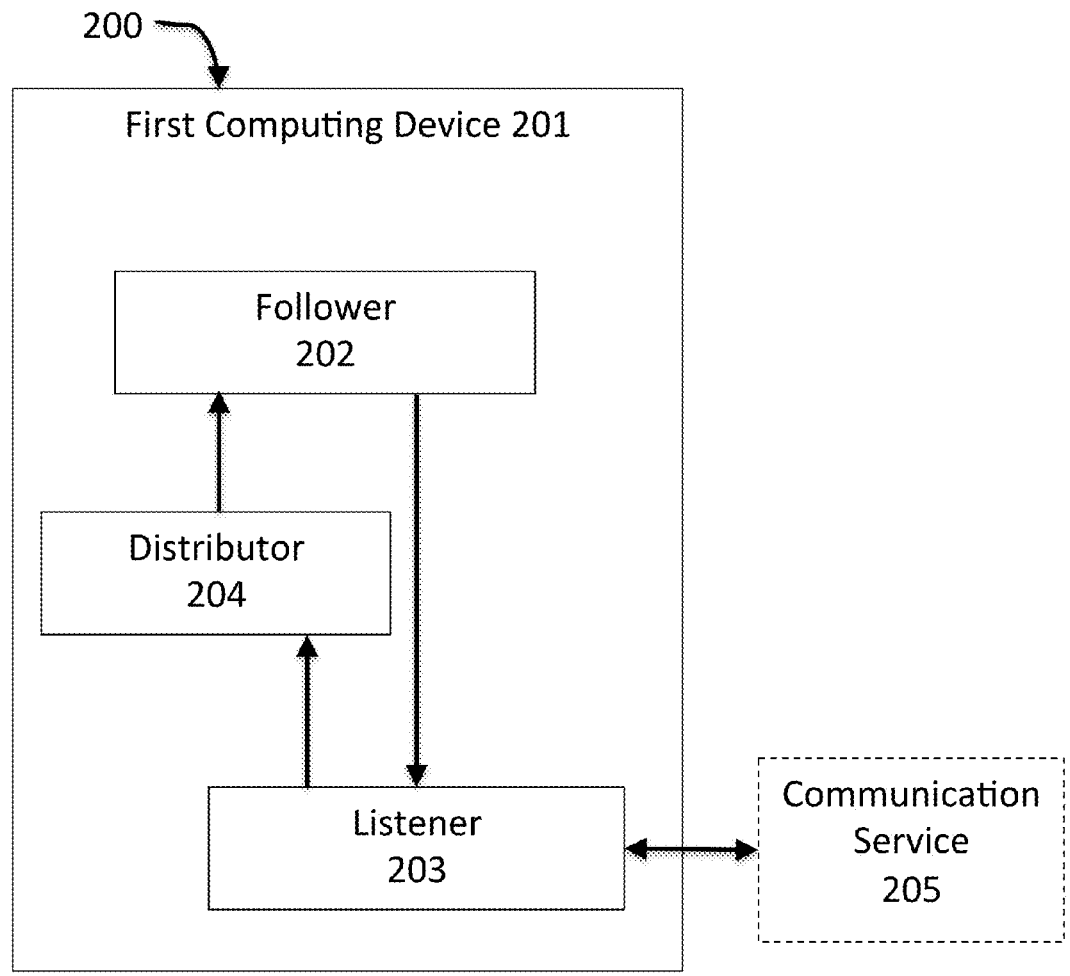
FIG. 2 is a schematic diagram depicting an embodiment of the disclosed system.

FIG. 2 depicts a system 200 for following topics in an electronic textual conversation. As an overview, the system includes a computing device 201. Executing on the computing device 201 is a set of algorithmic steps that may be conceptually described as creating at least one follower 202, at least one listener 203, and at least one distributor 204. The organization of tasks into those three components solely reflects a categorization of the tasks to be performed, and does not dictate the architecture of particular implementations of the system 200. For instance, in some embodiments of the system 200, the steps performed are executed by various objects in an object-oriented language, but the objects divide the tasks in a different manner than the above division. In other embodiments, the algorithmic steps exist as a set of instructions in a non-object oriented language, with no explicit separation of responsibility for steps into distinct components at all. Persons skilled in the art will recognize the existence of a broad variety of programming approaches that could cause the computing device 201 to perform the algorithmic steps.

Figure 1B:
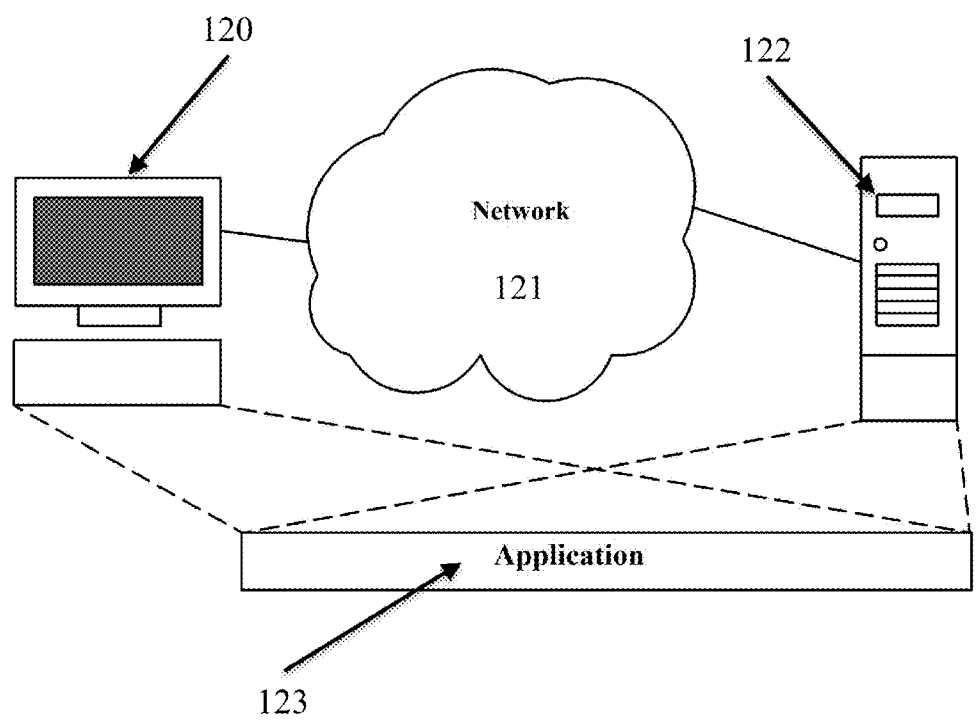
FIG. 1B is a schematic diagram depicting a network environment containing computing devices.

In some embodiments, the system 200 interacts with at least one communication service 205. In one embodiment, communication services 205 are systems that facilitate communication between computing devices over a network, such as the Internet. A communication service 205 may be an Internet "chat room" or comment thread, where users of various client devices may convey textual messages that are subsequently displayed on a web page by one or more servers 122 as described above in reference to FIG. 1B. A communication service 205 may be a search engine, such as the GOOGLE search engine produced by Google, Inc. of Mountain View, Calif. A communication service 205 may be a service that performs live streaming of textual messages, such as the TWITTER social networking service produced by Twitter, Inc. of San Francisco, Calif. A communication service may be a service providing electronic mail (email), for example using Simple Mail Transfer Protocol (SMTP). A communication service 205 may be a social network. A social network may be any facility connected to a network that establishes connections from one user to at least another user based upon the relationship between the users. The relationship may be based solely upon an invitation from one user to another to connect. The relationship may be based upon a familial relationship. The relationship may be based upon a romantic relationship. The relationship may be based upon a collegial relationship. Some users of social networks are connected to each other by virtue of attendance at a common educational institution. Some users of social networks are connected to each other by virtue of attendance at a common religious institution. Each user of a social network has a user account that lists that user's connections. The user account may also provide information identifying the user. The user account may include the user's name. The user account may include the user's occupation. The user account may include the user's geographical location. The user account also may contain a mechanism by means of which the user may be contacted. In some cases, the user account only permits contact via the social network, from users connected to the user. In some cases, the user account only permits contact via the social network, but that contact is open to users who are not connected to the user. In some cases, the user account lists direct contact information such as an electronic mail address. The social network may permit users to share files with each other. The social network may permit users to provide feedback and comments to each other concerning shared content.

Some communication services 205, such as the TWITTER service described above, function both to provide textual communication and to perform the functions of social networks. For instance, relationships between users can be established according to choices the users make to receive on their computing devices text produced by other users. Communication services 205 may provide metadata to aid in categorizing and sourcing the textual data they provide; for instance, a communication service 205 may support the use of metadata that indicates one or more topical relationships between messages, and aggregation of messages according to the topical metadata. As an example, some communication services 205 are designed to recognize a string of text preceded by a special character, such as a "hashtag," as identifying a topic of a message, and to provide a collection of messages sharing the same string of text when that string is selected in the instant message. As another example, a webpage may include one or more "meta" tags describing its topical contents in its hypertext markup language (HTML) header, and search engines may read the meta tags to determine whether the webpage is responsive to a search query.

Embodiments of the disclosed system and method relate to the manipulation of terms. In one embodiment, a term is a unit of data representable in textual form. A term may be a word. A term may be a phrase. A term may be any string of symbols that may be represented as text on a computing device 100 as described above in reference to FIGS. 1A-1B. A term may be a word or phrase represented in any writing system. A term may be a word or phrase represented in any language. A term may include a sequence of nucleotides described by AGTC notation. A term may include any string of numerical digits. A term may include any string of symbols whether their meanings are known or unknown to any person. A term may be stored in any data type suitable for storing textual data. The term may be stored in a character data type. The term may be stored in an array of character data types. The term may be stored in a string. Terms may be extracted from files or network packets containing text. Terms may be extracted from digital images, such as video and still photographs, depicting text; for instance, terms may be extracted from visual images using character recognition software. Terms may be extracted from audio data; for instance, the computing device 201 may transform an audio stream into text using voice recognition software, and extract terms from the resulting text.

Terms manipulated by the system 200 may be included in messages. In an embodiment, a message is collection of terms used on a communication service 205 as a single unit of conversation. A message may include a post to a comment thread or discussion board. A message may include a text message, such as those sent via Simple Messaging Service (SMS). A message may include an email message. A message may include a document, such as a word processor document or portable document file (PDF). The document may be attached to an email message. The document may be electronically transferred, for instance via File Transfer Protocol (FTP). A message may include the text associated with a single post to TWITTER (i.e. a "tweet"). A message may include a web page, such as a file displaying using Hypertext Transfer Protocol (HTTP). A message may include a sentence in an audio conversation, such as a conversation conducted via Voice over Internet Protocol (VoIP). A message may include a photograph that contains an image of text. A message may include video data that contains an image of text.

Embodiments of the system 200 follow electronic textual conversations concerning a topic. A textual conversation may be any exchange of messages that is representable as text. A textual conversation may take place over any communication service 205 as described above in reference to FIG. 2. A textual conversation may take place using any kind of term or message as described above in reference to FIG. 2. A textual conversation may use any protocol described above in reference to FIG. 2.

Referring to FIG. 2 in more detail, the system 200 includes a computing device 201. In some embodiments, the computing device 201 is a computing device 100 as disclosed above in reference to FIG. 1A. In other embodiments, the computing device 201 is a set of computing devices 100, as discussed above in reference to FIG. 1A, working in concert; for example, the computing device 201 may be a set of computing devices in a parallel computing arrangement. The computing device 201 may be a set of computing devices 100 coordinating their efforts over a private network, such as a local network or a virtual private network (VPN). The computing device 201 may be a set of computing devices 100 coordinating the efforts over a public network, such as the Internet. The division of tasks between computing devices 100 in such a set of computing devices working in concert may be a parallel division of tasks or a temporal division of tasks; as an example, several computing devices 100 may be working in parallel on components of the same tasks at the same time, where as in other situations one computing device 100 may perform one task then send the results to a second computing device 100 to perform a second task. In one embodiment, the computing device 201 is a server 122 as disclosed above in reference to FIG. 1B. The computing device 201 may communicate with one or more additional servers 122. The computing device 201 and the one or more additional servers 122 may coordinate their processing to emulate the activity of a single server 122 as described above in reference to FIG. 1B. The computing device 201 and the one or more additional servers 122 may divide tasks up heterogeneously between devices; for instance, the computing device 201 may delegate the tasks of the follower 202 to an additional server 122. In some embodiments, the computing device 201 functions as a client device 120 as disclosed above in reference to FIG. 1B.

The at least one follower 202 executes on the computing device 201. The at least one follower 202 in some embodiments is a computer program as described above in reference to FIGS. 1A and 1B. In some embodiments, each follower 202 is configured to select one or more primary terms related to a topic, to enumerate the messages of the first set in which a term appears and to add the term to a list of secondary terms if the enumeration exceeds a threshold amount. The computing device 201 may create a new follower per topic to follow. In some embodiments, the system 200 treats a given topic in one language as a different topic from the same topic as discussed in a second language, creating a follower per topic; for instance, if the topic is the 2014 World Cup of soccer, the system 200 may include one follower 202 for the 2014 World Cup as discussed in English, and another follower 202 for the 2014 World Cup as discussed in Spanish.

The at least one listener 203 executes on the computing device 201. The at least one listener 203 in some embodiments is a computer program as described above in reference to FIGS. 1A and 1B. In some embodiments, each listener 203 is configured to send, to at least one communication service, a first query, each query containing at least one primary term, and to receive, from the communication service, at least one first set of messages responsive to the first query. The system 200 may include a separate listener 203 for each communication service 205 the system 200 is querying. In some embodiments, the system 200 limits the number of listeners 203 to one listener 203 per communication service 205, to ensure that the system follows communication rules established by each communication service 205; for instance, a communication service may impose a limit for how frequently a computing device communicating with the communication service 205 may send a new query to the communication service 205.

The at least one distributor 204 executes on the computing device 201. The at least one distributor 204 in some embodiments is a computer program as described above in reference to FIGS. 1A and 1B. In some embodiments, the at least one distributor 204 is configured to receive, from the at least one listener, at least one first set of messages, to determine, for each message, at least one topic to which the message relates, to transmit each message to a follower corresponding to each related topic, and to extract, from a plurality of messages containing the one or more primary terms, a plurality of additional terms. In some embodiments, the computing device 201 may create additional distributors 204 as necessary to process larger volumes of messages, for instance where the computing device 201 is following many topics at once, or when one topic is the subject of a large amount of online conversation.

In some embodiments, the computing device 201 passes data between the follower 202, listener 203, and distributor 204 using a message broker (not shown). The message broker may be a software product for transmitting messages reliably between independent components. An example of a message broker is ACTIVE MQ, which is produced by the Apache Software Foundation, of Los Angeles, Calif. Another example is RABBIT MQ, which is produced by Pivotal Software Inc. of London, United Kingdom. In other embodiments, the data is stored and retrieved in one or more databases 112 as disclosed above in reference to FIG. 1A.

Figure 3A:
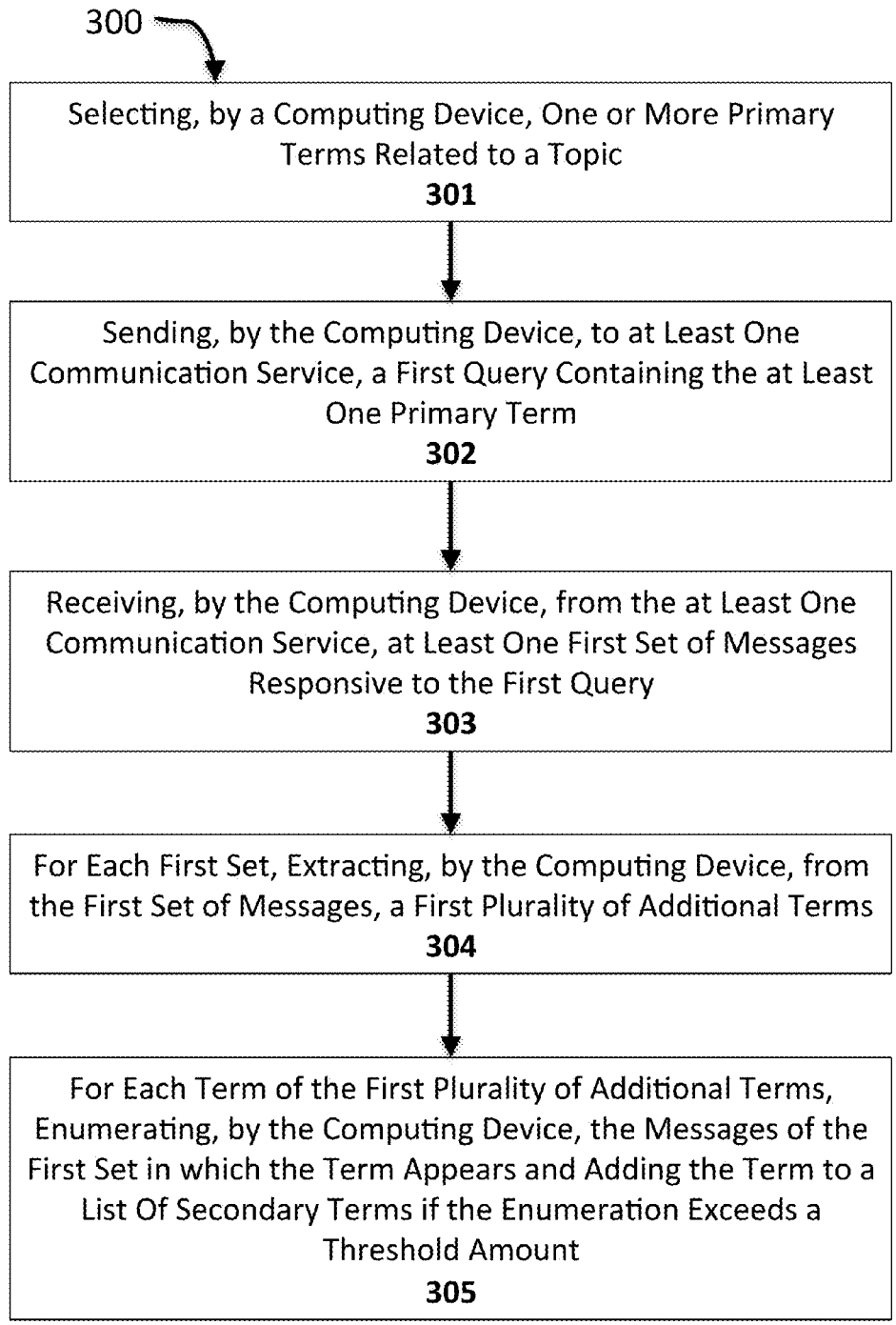
FIG. 3A is a flow chart illustrating one embodiment of the disclosed method.

FIG. 3A illustrates some embodiments of a method 300 for following a topic in an electronic textual conversation. The method 300 includes selecting, by a computing device, one or more primary terms related to a topic (301). The method includes sending, by the computing device, to at least one communication service, a first query containing the at least one primary term (302). The method 300 includes receiving, by the computing device, from the at least one communication service, at least one first set of messages responsive to the first query (303). The method 300 includes for each first set, extracting, by the computing device, from the first set of messages, a first plurality of additional terms (304). The method 300 includes for each term of the first plurality of additional terms, enumerating, by the computing device, the messages of the first set in which the term appears and adding the term to a list of secondary terms if the enumeration exceeds a threshold amount. (305).

Referring to FIG. 3A in greater detail, and by reference to FIG. 2, a follower 202 corresponding to the topic selects one or more primary terms related to the topic to follow (301). The primary terms may be terms that almost always return messages relating to the topic. For instance, the term "2014 World Cup of soccer" may be an effective primary term for locating messages relating to the 2014 World Cup of soccer; "2014 World Cup of Football" may be another effective primary term. In some embodiments, the computing device 201 receives an instruction describing the topic to follow. The instruction may come from a user of the computing device 201. The instruction may come from a user of a client device (not shown) in communication with the computing device 201. In some embodiments, the user enters a term identifying the topic. For instance, if the topic is the 2014 World Cup, the user may enter an instruction specifying that the computing device 201 follow the topic associated with the phrase "2014 World Cup of Soccer." The user may enter the phrase "2014 World Cup of Soccer" on the computing device 201. In other embodiments, the user may enter a set of related phrases concerning a topic the user wishes the computing device 201 to follow. The user may enter an instruction identifying a message that concerns the topic the user wants the computing device 201 to follow. The user may enter an instruction identifying a collection of messages concerning the topic 201 the user wishes the computing device 201 to follow. The user may enter one or more metadata concerning the topic the user wishes the computing device 201 to follow; for instance, the user may enter a "hashtag" identifier being used on one or more communication services 205 to identify the topic. The user may enter an instruction directing the computing device 201 to a file containing a set of terms that identify the topic to follow.

In some embodiments, where the user has entered one or more terms identifying the topic, the follower 202 selects those entered terms as the one or more primary terms. Where the user entered one or more metadata relating to the topic, the follower 202 may extract the one or more primary terms from the metadata. For instance, when the user enters a "hashtag" identifier relating to the topic, such as "#Worldcup2014," the follower 202 may adopt the identifier as a primary term; the follower 202 may remove a special character from the identifier to extract the primary term. The follower 202 may retrieve a set of messages linked to the one or more metadata entered by the user, and extract one or more primary terms from the set of messages. The follower 202 may extract one or more primary terms from a set of messages otherwise identified by the user as relating to the topic. As an example, the follower 202 may enumerate the terms appearing most frequently in a set of messages the user identified, directly or via metadata, as relating to the topic. The follower 202 may filter the enumerated terms to exclude those with a tendency to appear frequently in messages for all topics, for a given communication service 205. For instance, in some embodiments, the follower 202 may select from the most frequently appearing terms in the set of messages a subset having the highest hit/miss ratio as set forth in further detail below. In other embodiments, the follower 202 may weight the enumeration of each term in the message set by its inverse document frequency (idf) within a corpus of representative documents; persons skilled in the art will be aware that a term's idf within a corpus is a number that varies inversely with the term's frequency across all documents. As an example, the idf for the term "the" is an extremely small number, and consequently weighting an enumeration of appearances of "the" in a set of messages by its idf ensures that "the" will not be treated as important to the topic represented by that set of messages unless its frequency of use in those messages is unusually high.

The follower 202 may likewise enumerate metadata appearing in the set of messages; the follower 202 may weight the enumeration of metadata with idf from a representative corpus. The follower 202 may select metadata with a high initial hit/miss ratio within the messages, as set forth in further detail below. Where the user has identified the topic by entering an instruction directing the computing device 201 to a file describing the topic, the follower 202 may use the same methods identified above in reference to FIG. 3A for extracting one or more primary terms from a set of messages. If the file is identified as solely containing a collection of primary terms, the follower 202 may adopt all of the terms found in the file as the one or more primary terms. The follower may augment the primary terms resulting from the initial user instruction by reference to a collection of data identifying relationships between terms within a corpus. For instance, the follower 202 may add terms that are closely associated in a term-association vector space with one or more terms the user entered; the follower 202 may use one or more measures of vector proximity such as cosine similarity, within the vector space to identify degrees of relatedness.

In some embodiments, the computing device 201 receives an instruction identifying a new topic, and creates a new follower to follow a new topic. A user of the computing device 201 may enter the instruction. The computing device 201 may receive the new instruction from another computing device 201 (not shown); for instance, the other computing device may perform an algorithm for determining new topics to follow. The algorithm may poll a community of users for a topic to follow. The algorithm may rank topics according to popularity on one or more communication services 205; for example, the algorithm may rank "trending" topics and select a new topic to follow, based on the ranking. In some embodiments, the automatically selected new topic is published to a user, and the computing device 201 creates a new follower for the topic 202 only if the user enters an instruction approving the new topic.

At least one listener 203 sends, to at least one communication service, a first query containing the at least one primary term (302). In some embodiments, the computing device 201 creates a listener 203 for each communication service 205 to which the computing device 201 sends the first query. The computing device 201 may select communication services 205 for which to create listeners 203 by selecting communication services 205 from a list, or other collection, of identifiers of communication services 205 stored in memory accessible to the computing device 201. In some embodiments, the computing device may select all of the communication services 205 identified on the list. The computing device 201 may create a new listener 203 for each selected communication service 205. For a communication service 205 selected from a list of communication services 205 to query, the computing device 201 may also maintain, in memory accessible to the computing device 201, at least one instruction permitting the computing device 201 to determine how to query the communication service 205. The at least one instruction may identify a protocol, such as Text over Internet Protocol (ToIP) according to which the listener 203 may query the communication service 205. The communication service 205 may identify an application programming interface (API), by means of which the listener 203 may query the communication service 205. The API may be a streaming API that returns a stream of text in response to a query, such as the TWITTER public streaming API used by Twitter, Inc. of San Francisco, Calif., which returns a chunked HTTP steam of TWITTER statuses (sometimes known as "tweets). The communication service 205 may identify a search or query field; for instance, where the communication service 205 is a search engine such as the GOOGLE search engine described above, the listener 203 may locate the text field in which to enter searches, and then repeatedly search using that field, locating any new results. In some embodiments, the communication service 205 has policies stating how the listener 203 is permitted to interface with the communication service 205; the at least one instruction may identify those policies. In some embodiments, the listener 203 limits its behavior as dictated by the policy or policies.

In some embodiments, the listener 203 determines a way to query the communication service 205. The communication service 205 may identify a protocol according to which the listener 203 may query the communication service 205. The communication service 205 may identify an application programming interface (API) by means of which the listener 203 may query the communication service 205. In other embodiments, the listener 203 determines a way to query the communication service 205 by inspecting the communication service 205 directly. For instance, the listener 203 may access the document object of a communication service 205 that interfaces via HTTP, and determine fields that may be used for queries. The listener 203 may follow a URL to access related pages; for instance, the listener 203 may activate links, buttons, or similar items to access related pages. The listener 203 may identify messages within publically available data provided by the communication service 205. In some embodiments, the communication service 205 has policies stating how the listener 203 is permitted to interface with the communication service 205; for instance, the communication service 205 may have a "Robots.txt" file indicating the extent to which it permits automated navigation of the communication service 205. The listener 203 may receive the policy or policies and limit its behavior as dictated by the policy or policies.

At least one listener 203 receives, from the at least one communication service 205, at least one first set of messages responsive to the first query (303). In some embodiments, each set contains at least one message. In other embodiments, each set contains a plurality of messages. In some embodiments, each communication service 205 sends a single set of messages. In other embodiments, some communication services 205 send a plurality of messages; for instance, a communication service 205 may respond to a single query with a series of sets of messages. A communication service 205 may respond to a single query with a continuous stream of messages; the listener 203 receiving the stream of messages may divide the stream into a series of first sets of messages.

In some embodiments, one of the at least one distributor 204 creates a set of messages by identifying the language of each message returned in response to the query and creating a first set messages, wherein each message in the first set of messages is primarily in the determined language. The distributor 204 may identify the language by referring to metadata that identifies the language, such as metadata tags having language-identifying attributes. The distributor 204 may identify the language using a natural language detection tool. The distributor 204 may identify the language using one or more statistical techniques for language detection. In some embodiments, the distributor 204 identifies the language of a message by comparing its compressibility to that of reference texts in one or more languages. In other embodiments, the distributor 204 identifies a language by comparing its n-gram frequency to the n-gram frequencies of reference texts in one or more languages. The distributor 204 may identify the language in part by identifying the writing system in which the language is written. In some embodiments, the distributor 204 sorts the messages into sets of messages primarily in the detected language by determining a predominant language for each message, and placing that message into the set of messages corresponding to the identified predominant language. In other embodiments, the distributor 204 identifies the predominant language of each fragment of the message and places the message into the set corresponding to each identified language; the distributor 204 may insert a marker indicating which portions of the message are in the language corresponding to that set. In another embodiment, the distributor 204 divides the message into a set of smaller messages, each of which is predominantly in one language. The fragments may be sentences. The fragments may be paragraphs. In some embodiments, the computing device 201 creates follower 202 for each identified language; thus, each topic will have one follower per language identified relating to the topic. In some embodiments, the follower 202 creates a new listener 203 for the identified language. For instance, some languages, such as Japanese, Chinese, and Thai, do not use spaces between words, causing some communication services 205 to present messages in those languages incorrectly using streaming APIs; the computing device 201 may create a dedicated listener for such a language that uses a search function to retrieve messages in that language instead of using a streaming API.

The at least one distributor 204 extracts a first plurality of additional terms from the first set of messages, for each first set (304). In some embodiments, the distributor 204 uses a word tokenization tool to split the text of the message into words. The distributor 204 may select the word tokenization tool based on the language of the message or message fragment that the distributor 204 has detected, as set forth above in reference to FIG. 3A. In some embodiments, the distributor 204 extracts the terms by storing the words in the message's data structure, in a way that permits a follower 202 to access them. In other embodiments, the distributor 204 extracts the terms by placing the words into a separate data structure that is passed on to one or more followers 202. The distributor 204 may also place phrases from the message into the data structure; for instance, the distributor 204 may place each n-gram found in the message, for all n from 1 to the length in words of the message, into the data structure as phrases. In some embodiments, the distributor 204 matches the extracted phrases to the at least one primary term selected by a follower 202. The distributor may maintain data linking the at least one primary term to the follower 202 that requested it. In some embodiments, the distributor 204 passes the message to each follower 202 that requested a primary term matching a term in the message. In other embodiments, the distributor 204 passes the extracted terms to each follower 202 that requested a primary term matching a term in the message.

For each term of the plurality of additional terms, the at least one follower 202 enumerates the messages of the first set in which the term appears, and adds the term to a list of secondary terms if the enumeration exceeds a threshold amount (305). In some embodiments, the follower 202 maintains, for each term, an numerical variable initialized to zero, and adds an incremental amount the variable for each message containing the term; for instance, the follower 202 may add 1 to the variable for each message containing the term. In some embodiments, the follower 202 additionally enumerates by weighting the enumeration of each term according to the frequency of the term in a corpus of documents. For instance, the follower 202 may maintain a hit/miss ratio for each term, where the number of hits is based on the enumeration of messages containing the term, and the number of misses is based on the number of occurrences of the term found in a certain quantity of text; as an example, the number of misses may be based on average number of occurrence of the term in a million messages posted to the TWITTER communication service 205 described above. The threshold may be a number that the hit/miss ratio must exceed for the term to be added to the list of secondary terms. As an example, if the hit/miss ratio for the term exceeds 10 percent, the term may be added to the list of secondary terms. In some embodiments, the distributor 204 identifies the language of the message from which the term was extracted and the follower 202 weights the enumeration of each term according to the frequency of the term in a corpus of documents in the same language as a message from which the term was extracted. The distributor 204 may identify the language of the message as described above in reference to FIG. 3A. The follower 202 may weight the enumeration using a hit/miss ratio as described above; the number of misses may be based on the average number of occurrences of the term in a certain amount of text in the identified language. In some embodiments, the follower 202 stores the messages in memory accessible to the computing device 201. The follower 202 may store the messages in a database 112 as described above in reference to FIG. 1A.

Figure 3B:
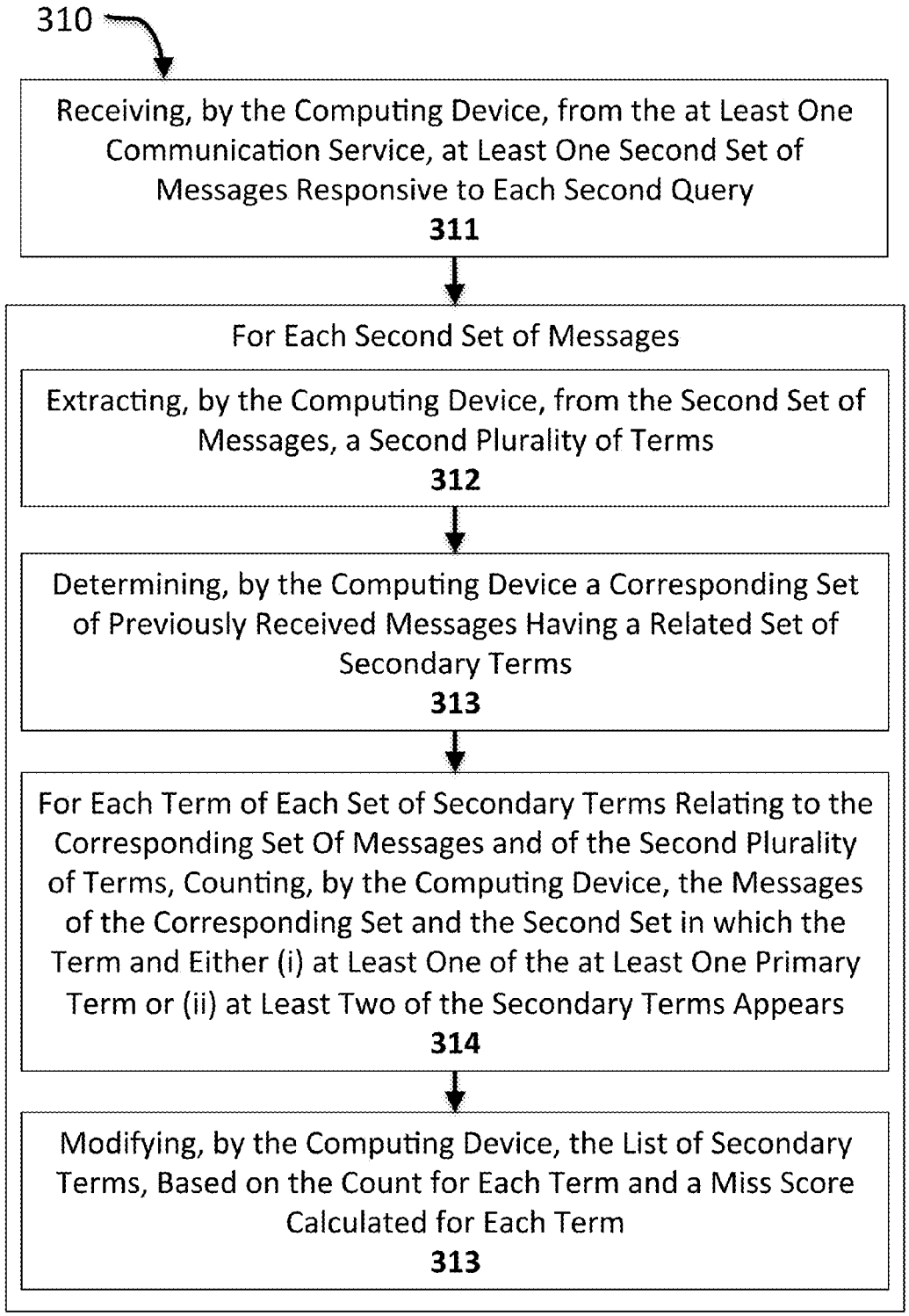
FIG. 3B is a flow chart illustrating some steps of one embodiment of the disclosed method.

In some embodiments, the listener sends at least one second query containing the at least one primary term and the set of secondary terms to the at least one communication service 205. FIG. 3B illustrates one embodiment of an additional set of method steps 310 for using queries containing the primary and secondary terms to update the list of secondary terms. The additional set of method steps 310 involves receiving, by the computing device, from the at least one communication service, at least one second set of messages responsive to each second query (311). For each second set of messages, the additional method 310 involves extracting, by the computing device, from the second set of messages, a second plurality of terms (312); determining, by the computing device, a corresponding set of previously received messages having a related set of secondary terms (313); for each term of each set of secondary terms relating to the corresponding set of messages and of the second plurality of terms, counting, by the computing device, the messages of the corresponding set and the second set in which the term and either (i) one of the at least one primary term or (ii) at least two of the secondary terms appears (314); and modifying, by the computing device, the list of secondary terms, based on the count for each term and a miss score calculated for each term (315).

Referring to FIG. 3B in greater detail, and by reference to FIG. 2, the at least one listener 203 receives, from the at least one communication service, at least one second set of messages responsive to each second query (311). In some embodiments, the at least one listener 203 receives the at least one second set of messages as performed above in reference to step 303 of FIG. 3A. In some embodiments, the at least one distributor 204 receives the at least one second set of messages by, for each second query, determining the language of each message returned in response to the second query and for each determined language, creating a second set of messages, wherein each message in the second set of messages is primarily in the determined language. The distributor 204 may determine the language of each message as described above in reference to FIG. 3A.

The distributor 204 extracts, from the second set of messages, a second plurality of terms (312). In some embodiments, the distributor 204 extracts the second plurality of terms in the manner described above in step 304 of FIG. 3A for extracting the first plurality of terms.

For each second set of messages, the distributor 204 determines a corresponding set of previously received messages having a related set of secondary terms (313). In some embodiments, where the distributor 204 maintains a mapping of terms to followers 202 requesting the terms, the distributor 204 determines the corresponding set of previously received messages by associating the message containing a term with the set of messages previously sent to the follower 202 corresponding to that term. The related set of secondary terms may be a set of secondary terms created as disclosed above in reference to step 305 of FIG. 3A. The related set of secondary terms may be several such sets of secondary terms, combined together. The distributor 204 may associate each term with more than one follower 202 if the computing device is following more than one topic at once. The distributor 204 may associate each message with more than one follower 202 if the computing device 201 is following more than one topic at once. In some embodiments, where the distributor 204 has determined the language of the message, the distributor 204 further determines the corresponding set of previously received messages by determining all previously received messages in the determined language; for instance, the distributor 204 may maintain in memory accessible to the computing device 201 a record of which follower 202 for a given topic is assigned to which language, and thus may assign the message to that follower, based on the determination of the language. The assignment to one or more followers 202 of the message based on language may proceed as disclosed above in reference to FIG. 3A.

The at least one follower 202 counts, for each term of each set of secondary terms relating to the corresponding set of messages and of the second plurality of terms, the messages of the corresponding set and the second set in which the term and either (i) one of the at least one primary term or (ii) at least two of the secondary terms appears (314). In some embodiments, the follower 202 counts as described above by incrementing a counter variable for each term every time the follower 202 encounters a message containing the term and at least one primary term or at least two secondary terms. In other embodiments, the follower increments the variable by an amount that reflects the degree to which the message matches the topic. In some embodiments, the follower 202 counts by computing, for each of the messages of the corresponding set of previously received messages and the second set in which the term and either (i) one of the at least one primary term or (ii) at least two of the secondary terms appears, a weight based on the number of primary and secondary terms appearing in the message, and incrementing the count for the term by an amount determined by the weight. As an example, the follower 202 may increment the count by 1 for any message containing the term and one or more primary terms, and increment the count by a different amount for messages containing no primary terms but containing two or more secondary terms. In some embodiments, the follower 202 determines the hit/miss ratio for one or more of the secondary terms, calculated as set forth in more detail below, and increments the count by a weight determined by the determined hit/miss ratio. For instance, the follower 202 may rank the secondary terms found in the message according to hit/miss ratio and increment the count by one half of the hit/miss ratio of the second-ranked secondary term. Some embodiments also involve increasing the miss score for the term by an amount determined by the weight. For instance, if the follower 202 incremented the count by 4/5 of the hit/miss ratio of the second-ranked secondary term, the follower may increase the miss score by 1/5 of the hit/miss ratio of the secondary term. In some embodiments, the miss score is increased by an amount derived by multiplying the hit/miss ratio of the second-ranked term by an amount equal to 1 minus the amount by which the hit/miss ratio is multiplied to increment the number of hits. A user may enter an instruction on the computing device 201 to adjust the number multiplied with the hit/miss ratio of the second-ranked term to increment the count; for instance, the number may be lowered if the user finds the messages being found by the system 200 are going too far off-topic.

The follower 202 modifies the list of secondary terms, based on the comparison for each term (315). In one embodiment, the calculated miss score is a score representing the probability of encountering the term in a message that is unrelated to the topic. In some embodiments, follower 202 performs the comparison by calculating a hit/miss ratio, which is the ratio of the count to the miss score. Where the term is being extracted for the first time in the query, the miss score may be calculated as described above in reference to FIG. 3A. In some embodiments, the follower 202 modifies the list by determining that a term of the second plurality of terms is not in the list of secondary terms, calculating the miss score for the term according to the frequency of the term in a corpus of documents, determining that the count of the term exceeds a threshold relative to the magnitude of the miss score of the term, and adding the term to the list of secondary terms, based on the determination that the count exceeds the threshold value. The follower 202 may also determine the language of the message from which the term was extracted and select a corpus of documents in the determined language from which to derive the miss score.

In some embodiments, the follower 202 modifies the list of secondary terms by determining that a term of the second plurality of terms is in the list of secondary terms, calculating the miss score by enumerating a number of messages in the second set of messages and in the corresponding set containing the term in which neither (i) one of the at least one primary term nor (ii) at least two of the secondary terms appears, determining that the count of the term does not exceed a threshold relative to the magnitude of the miss score of the term, and removing the term from the list of secondary terms, based on the determination that the count does not exceed the threshold. For instance, the follower 202 may calculate a hit/miss ratio by dividing the count by the miss score, and discard the term from the list of secondary terms if the hit/miss ratio is less than a certain amount, such as 10 percent. The follower 202 may discard the number of occurrences in the corpus of documents and replace it with the enumeration-based miss score. The follower 202 may add the enumeration-based miss score to the score based on the frequency of occurrences in the corpus of documents. The computing device 201 may determine, based on the hit/miss ratio of messages returned by a communication service 205, that the communication service 205 should not be queried anymore. The computing device 201 may delete the listener 203 corresponding to the communication service 205, based on the determination. For instance, if fewer than some percentage from the communication service 205 contain one or more primary term or two or more secondary terms, the computing device 201 may determine that the communication service 205 is not worth querying.

In other embodiments, the follower 202 modifies the list of secondary terms by calculating a score for each term of the list of secondary terms by comparing the count for that term to the number of messages of the corresponding set of previously received messages and the second set of messages in which either (i) one of the at least one primary term or (ii) at least two of the secondary terms appears, ranking the terms of the secondary list of terms according to the calculated scores, and eliminating the lowest-scoring term. For instance, the follower 202 may base the score for each secondary term on its hit/miss ratio, calculated as described above in reference to FIG. 3B. The follower 202 may repeat the elimination of the lowest scoring secondary term one or more times, eliminating the lowest-scoring plurality of terms. In some embodiments, limiting the list of secondary terms to terms having scores allows the computing device 201 to save computing resources while still following a topic effectively, by using the most effective terms as revealed by the calculated score. In some embodiments, the follower 202 provides the hit/miss ratio of each secondary term to the listener 203, and the listener limits its queries to the terms with the highest hit/miss ratio to save computing resources.

The follower 202 may calculate the score by determining that a message received in response to a second query is spam, discarding the message, and increasing the miss score for all terms appearing in the message. In one embodiment, a message is "spam" if its contents are repeated in substantially identical forms a plurality of times, and if its contents have no genuine substantive relationship to the topic. The repetition of spam may involve the creation of a plurality of exact duplicates of a message; for instance, the same message may be posted repeatedly to one or more communication services 205. The repetition may involve the creation of a plurality of messages with nearly exactly identical contents; for instance, the same message body may be associated with varying titles. The same message body may be associated with varying originating user accounts, which may be collected by a single malware network and used for the purpose of sending ostensibly distinct messages. The same message body may be associated with varying metadata. In some embodiments, repetition involves the repeated generation of a largely identical message body with trivial alterations. For example, a first spam message may state that "Lauren could not believe it was possible to make $2,300 per day working from home for only 30 hours a week," while a second spam message may state that "Gina could not believe it was possible to make $3,100 per day working from home for only 28 hours a week." The repetition may involve the repeated reuse in many messages of a single phrase, such as "one weird trick," or "one simple rule doctors don't want you to know about." The repetition may involve the inclusion in apparently distinct messages of the same reference to a product or service being advertised by the message; for instance, a natural language processing program may produce various messages containing apparently distinct combinations of words and phrases, each of which contains a URL to the advertised product or service.

In some embodiments, the contents of a spam message have no genuine relationship to the topic. The entirety of the message may be unrelated to the topic, but posted to a conversation thread on the subject of the topic. The message may contain metadata indicating a relationship to the topic while containing a message body unrelated to the topic; for instance, the spam message may contain a hashtag associated with the 2014 world cup of soccer while containing a message body touting a purported pharmaceutical product. In other embodiments, the spam message has an unrelated body with a superficial word or phrase inserted to create the illusion that it relates to the topic. For instance, the message may have an inserted phrase associated with the topic, while the remainder of the message body has no relationship to the topic whatsoever; as an example, where the topic is the 2014 World Cup, the message may state: "I think Brazil is going to win the World Cup. You won't believe how easy it is to lose weight using this one weird fruit!" The follower 202 may use any spam detection technique to identify a message as spam.

In some embodiments, the follower 202 saves each message in which either (i) one of the at least one primary term or (ii) at least two of the secondary terms appears in memory accessible to the computing device. The follower 202 may save messages to a database 112 as disclosed above in reference to FIG. 1A. In some embodiments, the database is indexed for retrieval by topic. In other embodiments, the database is indexed for retrieval by primary terms. In additional embodiments, the database is indexed for retrieval by secondary terms. The computing device 201 may have an interface that allows a user to enter one or more terms relating to a topic. The computing device 201 may use the one or more terms to retrieve the messages concerning one or more topics; for instance, the computing device 201 may compare the terms entered by the user to primary terms used to follow topics. The computing device 201 may compare the terms entered by the user to secondary terms used to follow topics. The term comparison may use a term-association vector space; for example, the computing device 201 may use vector proximity within such a space to find primary and secondary terms that are closely related to the user-entered terms within a corpus. The computing device 201 may search the messages related to topics for the user-entered terms. Where the computing device 201 fails to encounter matches to the user-entered terms, or where the user enters an instruction indicating that the search results are not what the user was looking for, the computing device 201 may use the user-entered terms to follow a new topic, as described above in reference to FIG. 3A.

In some embodiments, the computing device 201 publishes a set of messages in which either (i) one of the at least one primary term or (ii) at least two of the secondary terms appears. The computing device 201 may generate a display showing a representation of the topic, the selection of which by a user causes the set of messages to display. The computing device 201 may display a representation of each message; for instance, the computing device 201 may display a link containing the title of each message, so that the user can select the link to view the message. The computing device 201 may publish the messages by making them available to a communication service 205. For example, the computing device 201 may post a representation of the messages to one or more communication services 205 that accept and display conversation posts; the posting to the communication services 205 may be offered to the communication services 205 as a way to enhance their ability to collate messages and present them to the public. As another example, the computing device 201 may publish the message set in a form in which a communication service 205 that specializes in locating publications electronically can encounter the publication; for instance, the message set may be published on a web page visible to search engine indexing crawlers. Publication may be performed using any device for outputting information from a computing device 100 as disclosed above in reference to FIG. 1A.

In some embodiments, the follower 202 determines that a message containing the term is a duplicate of a previously received message, discards the message, and excludes the message from the count of messages of the corresponding set and the second set in which the term and either (i) one of the at least one primary term or (ii) at least two of the secondary terms appears. In so doing, the follower 202 may avoid presenting duplicate messages to a user reading the messages found by the follower 202. The follower 202 may also avoid overemphasizing the use in queries of terms that tend to produce duplicate messages; for instance, a single user may have created a message concerning the topic that has an idiosyncratic phrase that no other user adopts in the conversation, but the message itself may be retransmitted many times by other users, creating the false impression that the phrase is associated with a large volume of distinct information regarding the topic. In some embodiments, the follower 202 maintains a number for each message representing the number of duplicates of the message the follower 202 encountered; the follower 202 may also maintain a number representing the number of distinct users that have retransmitted the message. The follower 202 may use other indicia of user interest to distinguish between voluntarily retransmitted messages and those that have been retransmitted automatically, for instance by a computing device that has been infected with a "spam bot" to retransmit commercial or malicious messages, as described in further detail above in reference to FIG. 3B.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A method for following a topic in an electronic textual conversation, the method comprising:

selecting, by a computing device, one or more primary terms related to a topic;

sending, by the computing device, to at least one communication service, a first query containing the at least one primary term;

receiving, by the computing device, from the at least one communication service, at least one first set of messages responsive to the first query;

for each first set, extracting, by the computing device, from the first set of messages, a first plurality of additional terms;

for each term of the first plurality of additional terms, enumerating, by the computing device, the messages of the first set in which the term appears and adding the term to a list of secondary terms if the enumeration exceeds a threshold amount;

sending, by the computing device, to the at least one communication service, at least one second query containing the at least one primary term and the set of secondary terms;

receiving, by the computing device, from the at least one communication service, at least one second set of messages responsive to each second query;

for each second set of messages:
extracting, by the computing device, from the second set of messages, a second plurality of terms;
determining, by the computing device, a corresponding set of previously received messages having a related set of secondary terms;
for each term of each set of secondary terms relating to the corresponding set of messages and of the second plurality of terms, counting, by the computing device, the messages of the corresponding set and the second set in which the term and either (i) one of the at least one primary term or (ii) at least two of the secondary terms appears; and
modifying, by the computing device, the list of secondary terms, based on the count for each term and a miss score calculated for each term.

2. The method of claim 1, wherein receiving the at least one first set of messages further comprises:
identifying the language of each message returned in response to the first query; and
for each determined language, creating a first set messages, wherein each message in the first set of messages is primarily in the determined language.

3. The method of claim 1, wherein enumerating further comprises weighting the enumeration of each term of the first plurality of additional terms according to the frequency of the term in a corpus of documents.

4. The method of claim 3, wherein weighting further comprises:
determining the language of a message from which the term was extracted; and
weighting the enumeration of each term according to the frequency of the term in a corpus of documents in the same language as a message from which the term was extracted.

5. The method of claim 1, further comprising storing, by the computing device, the first set of messages in memory accessible to the computing device.

6. The method of claim 1, wherein receiving the at least one second set of messages further comprises, for each second query:
determining the language of each message returned in response to the second query; and for each determined language, creating a second set of messages, wherein each message in the second set of messages is primarily in the determined language.

7. The method of claim 6, wherein determining the corresponding set of previously received messages further comprises determining all previously received messages in the determined language.

8. The method of claim 1, wherein counting further comprises:
computing, for each of the messages of the corresponding set of previously received messages and the second set in which the term and either (i) one of the at least one primary term or (ii) at least two of the secondary terms appears, a weight based on the number of primary and secondary terms appearing in the message; and
incrementing the count for the term by an amount determined by the weight.

9. The method of claim 8, further comprising increasing the miss score for the term by an amount determined by the weight.

10. The method of claim 1, wherein modifying further comprises:
determining that a term of the second plurality of terms is not in the list of secondary terms;
calculating the miss score for the term according to the frequency of the term in a corpus of documents;
determining that the count of the term exceeds a threshold relative to the magnitude of the miss score of the term; and
adding the term to the list of secondary terms, based on the determination that the count exceeds the threshold value.

11. The method of claim 10, further comprising:
determining the language of the message from which the term was extracted; and selecting a corpus of documents in the determined language.

12. The method of claim 1, wherein modifying further comprises:
determining that a term of the second plurality of terms is in the list of secondary terms; calculating the miss score by enumerating a number of messages in the second set and corresponding set containing the term in which neither (i) one of the at least one primary term nor (ii) at least two of the secondary terms appears;
determining that the count of the term does not exceed a threshold relative to the magnitude of the miss score of the term; and
removing the term from the list of secondary terms, based on the determination that the count does not exceed the threshold.

13. The method of claim 1, wherein modifying further comprises:
calculating a score for each term of the list of secondary terms by comparing the count for that term to the number of messages of the corresponding set of previously received messages and the second set of messages in which either (i) one of the at least one primary term or (ii) at least two of the secondary terms appears;
ranking the terms of the secondary list of terms according to the calculated scores; and eliminating the lowest-scoring term.

14. The method of claim 1, further comprising:
determining that a message containing the term is spam;
discarding the message; and
increasing the miss score for all terms appearing in the message.

15. The method of claim 1, further comprising saving, in memory accessible to the computing device, each message in which either (i) one of the at least one primary term or (ii) at least two of the secondary terms appears.

16. The method of claim 1, further comprising publishing a set of messages in which either (i) one of the at least one primary term or (ii) at least two of the secondary terms appears.

17. The method of claim 1, further comprising:
    determining that a message containing the term is a duplicate of a previously received message;
    discarding the message; and
    excluding the message from the count of messages of the corresponding set and the second set in which the term and either (i) one of the at least one primary term or (ii) at least two of the secondary terms appears.

18. A system for following topics in an electronic textual conversation, the system comprising:
    a computing device;
    at least one listener, executing on the computing device, each listener configured to send, to at least one communication service, a first query, each query containing at least one primary term related to a topic, to receive, from the communication service, at least one first set of messages responsive to the first query, to send, to the at least one communication service, at least one second query containing the at least one primary term and a set of the secondary terms, and to receive, from the at least one communication service, at least one second set of messages responsive to each second query;
    at least one follower, executing on the computing device, each follower configured to select the at least one primary term, to enumerate the messages of the first set in which each of a plurality of additional terms appears, to add each term of the plurality of additional terms to a list of secondary terms if the enumeration exceeds a threshold amount, to determine a corresponding set of previously received messages having a related set of secondary terms, to count, for each term of each set of secondary terms relating to the corresponding set of messages and of a second plurality of terms, messages of the corresponding set and the second set in which the term and either (i) one of the at least one primary term or (ii) at least two of the secondary terms appears, and to modify the list of secondary terms, based on the count for each secondary term and a miss score calculated for each secondary term; and
    at least one distributor, executing on the computing device, and configured to receive, from the at least one listener, at least one first set of messages, to determine, for each message of the first set of messages, at least one topic to which the message relates, to transmit each message to a follower corresponding to each related topic, to extract, from a plurality of messages containing the one or more primary terms, the first plurality of additional terms, and to extract, from the second set of messages, the second plurality of terms.

* * * * *